United States Patent Office 3,073,237
Patented Jan. 15, 1963

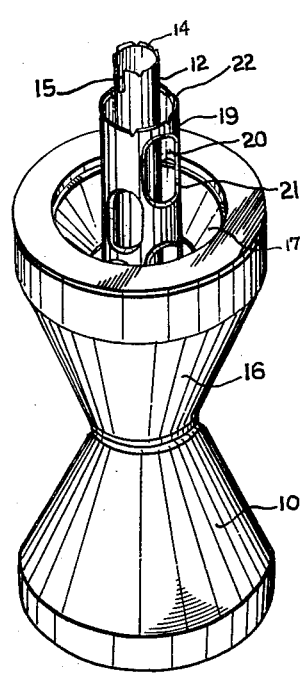
Fig. 1.
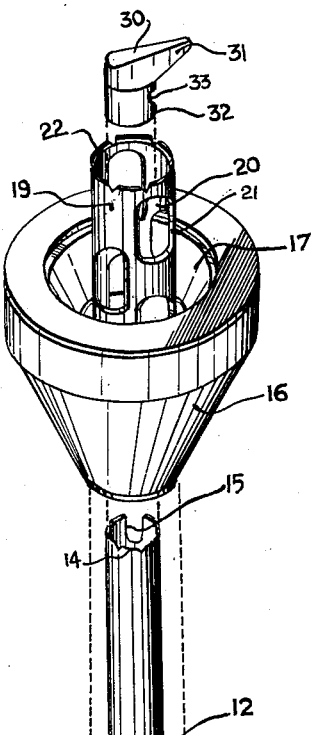
Fig. 3.
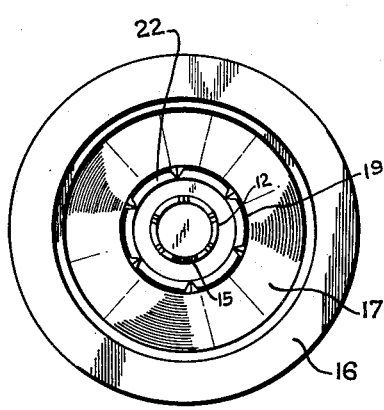
Fig. 2.
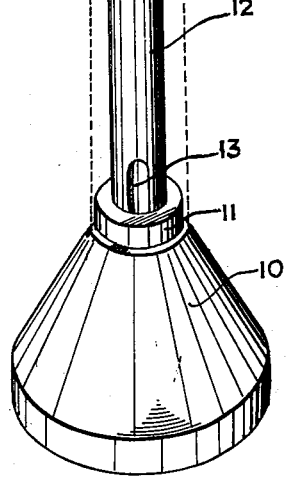

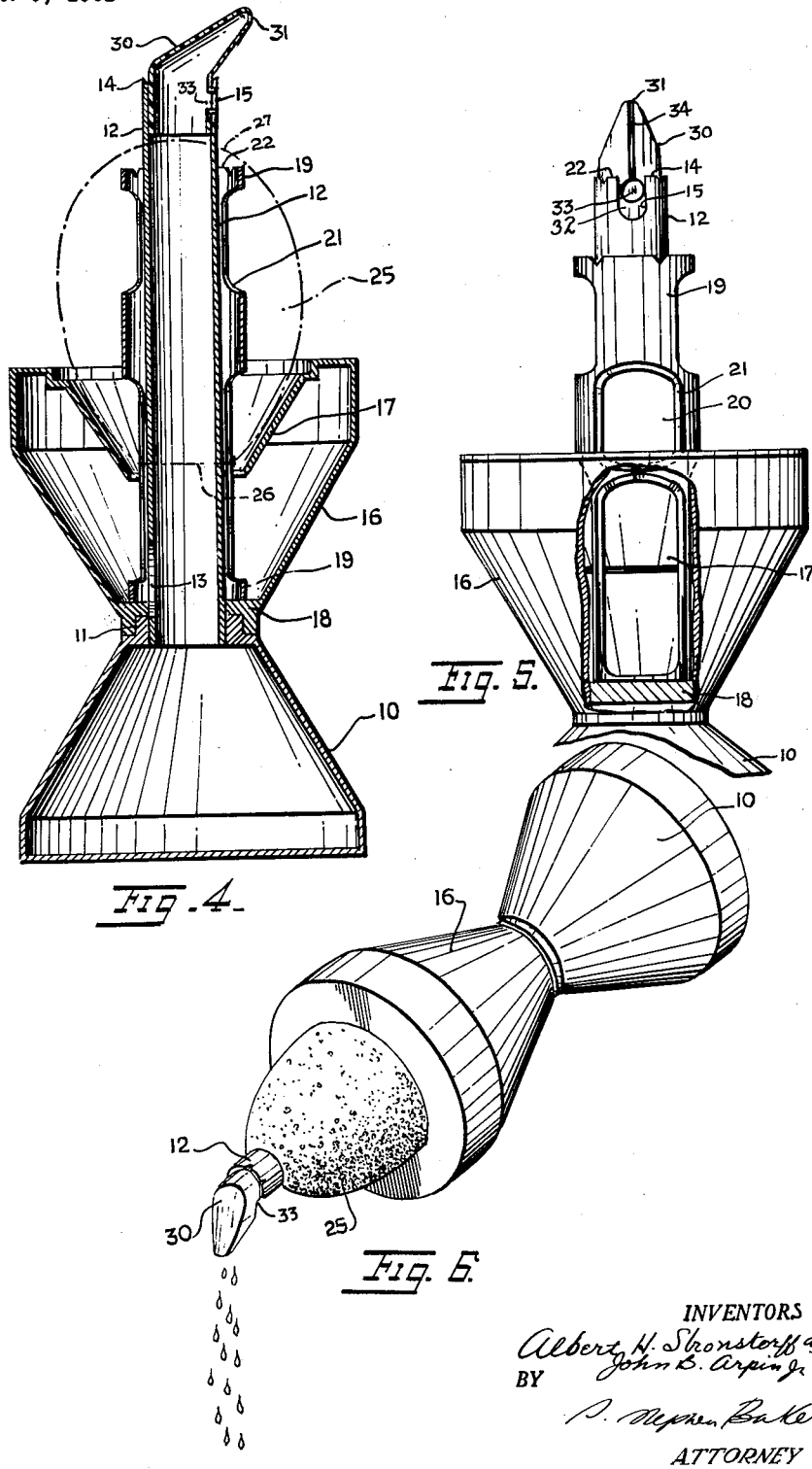

3,073,237
FRUIT JUICING, STORING AND DISPENSING APPARATUS
Albert H. Stronstorff, 1009 Woodgate Ave., Elberon, N.J., and John B. Arpin, Jr., Melville St., Oakhurst, N.J.
Filed Jan. 9, 1961, Ser. No. 81,530
14 Claims. (Cl. 100—108)

This invention relates to a fruit juicing apparatus and more particularly a device which extracts, stores, and dispenses fruit juice all in a particularly efficient, convenient, and practical manner.

As one example, it is most desirable to dispense fresh lemon juice on various foods such as fish or salads. There have been various difficulties and objections in devising a suitable device for so doing. We have eliminated most of these objections by the present apparatus.

According to our device, we employ a special form of vertical coring tube member upon which is pressed and deposited a fresh lemon so that the coring tube member penetrates the lemon and further serves as a dispensing spout. At the same time that the lemon is cored, its juice flows down through openings of a juicing tube and into a juice reservoir which also serves as a supporting stand for the device. Accordingly, the fresh lemon is always supported in an upright position, the juice extracted therefrom being stored in the supporting reservoir. In order to dispense the juice, it is only necessary to lift the lemon in its stand while inclining it so that the juice runs out of the reservoir, seemingly through the lemon. In other words, while the juice is essentially dispensed from the reservoir, is passes through the lemon body in so doing.

Means are also provided to render the apparatus dripproof and to thereby avoid objectionable messiness.

The lemon will remain installed in the apparatus until its juice is exhausted. Thus it may remain on a dining table to be used as required or may be stored in toto in a referigerator.

The invention will be further understood from the following description and drawings in which:

FIGURE 1 is a perspective view of a fruit juicing apparatus constructed according to this invention but without the cap as will be hereinafter described;

FIGURE 2 is a top plan view thereof;

FIGURE 3 is an exploded view of the apparatus with the cap included but rotated slightly out of position to clarify its construction;

FIGURE 4 is a longitudinal cross-sectional view of the complete apparatus;

FIGURE 5 is an upper fragmentary elevational view; and

FIGURE 6 is a perspective view showing how the lemon juice is poured.

Referring to FIGURE 3, the device comprises support 10 which is hollow and serves as a juice reservoir. It may be fabricated of any suitable metal or the like. It is formed with a neck or collar 11 into which is deposited, as by press fitting, an elongated coring tube 12. Tube 12 is formed with a lowermost lateral opening 13 into which juice may flow into supporting reservoir 10 as will be hereinafter described. In a satisfactory embodiment, reservoir 10 was about 2" high and almost 3" wide at its base while the length of tube 12 was about 4" and its diameter about 5/8". Of course, these dimensions are purely representative.

The upper end 14 of coring tube 12 is sharpened and toothed so that it may easily penetrate the fruit. It is formed with a pouring opening 15 as will hereinafter be described.

Deposited upon neck 11 is upper chamber 16 which, like reservoir 10 is frusto-conical, the cones being opposed as being illustrated in FIGURE 1. Chamber 16 is formed with a conical baffle 17 which has a central opening as does the lower end of chamber 16 these openings permitting the coring tube 12 to be inserted therein when the device is assembled.

Connected to the floor 18 of chamber 16 is the juicing tube 19. Juicing tube 19 is larger in diameter than tube 12. For example, it may be 1" in diameter. It is formed with large sidewall openings 20 defined by sharpened edges 21. The upper end 22 of juicing tube 19 is toothed. Tube 19 is also vertically elongated and is concentric with and surrounds tube 12 although it is shorter than tube 12.

In the form shown, the device is assembled by simply slipping chamber 16 over coring tube 12 and depositing it over the neck 11 where it is frictionally retained. However, any suitable method of assembly may be employed.

The device is initially used without the cap as will be hereinafter described. Referring to FIGURE 4, a lemon 25, the juice of which is to be squeezed therefrom, has its end first sliced away as illustrated at 26. With this end foremost, the lemon 25 is then deposited firmly over the upper end 14 of coring tube 12 and, while being pushed down over the juicing tube 19, it is rotated slightly until its upper end 27 rests upon the toothed upper end 22 of juicing tube 19. Thus a top skin portion of the lemon is disposed between the respective upper ends of the tubes 12 and 19 as illustrated in FIGURE 4. Ordinariy, the lemon will be large enough and it will be seated on baffle 17 which, it will be observed, is so formed as to seat it. If it is smaller it may remain suspended over the baffle. Ordinarily, a lime will not reach the baffle although it may nevertheless be squeezed by the instant device.

After the lemon has been impaled it will be found that the coring tube 12 has cut a hole through the top of the lemon and a wad of pulp and the piece of end lemon skin may be simply picked off and discarded.

It will be found that the act of impaling the lemon 25 on the tubes 12 and 19 while turning it slightly while it is impaled, causes the juice to flow through the openings 20 of juicing member 19 and down through the chamber 16, through opening 13, and into reservoir 10. Hardly any squeezing is necessary and in fact the lemon does not become distorted in shape. The cutting edges 21 slice through the lemon so that the juice is caused to flow, the flow being indicated by the arrows depicted in FIGURE 4.

The lemon juice accumulated in reservoir 10 may now be dispensed. It will be observed that the dispensing opening 15 is 180° removed from lateral inlet opening 13. The reason for such orientation is that when the device is tilted as in FIGURE 6 to dispense the juice, it will not flow through opening 13. Even if it accidentally does, it will nevertheless be caught or restrained by the baffle 17 and will be returned to the reservoir when the device is righted. Opening 15, however, indicates the proper direction in which to tilt the device for dispensing the juice.

In order to regulate such dispensing and to further insure correct orientation while also covering the device, a cap 30 is provided which fits into the upper end of tube 12. Cap 30 is formed with a dispensing beak 31 and a locating boss 32 which fits into dispensing outlet 15 in such a way that the beak 31 points in the direction in which the device is to be tilted when poured. Boss 32 is formed with an opening 33 which coincides or communicates with pouring opening 15 so that the juice will flow out of pouring opening 15 through opening 33 and along the underside of beak 31 where it will flow as illustrated in FIGURE 6. As illustrated in FIGURE 5, the underside of beak 31 may be grooved as at 34 to provide a predetermined path for the juice. In FIGURE 3, the cap 30 is shown rotated away from its seating position in order to clarify the construction thereof.

The device will rest on a table with the cap 30 installed in place. The juice will be dispensed as required. The device may also be stored in a refrigerator until the juice is exhausted. When used, it gives the impression that the juice is flowing right from the lemon although in fact it is pouring from the reservoir 10 through tube 12.

The provision of baffle 17 renders the device drip-proof and juice will only flow as calculated. It may further be easily disassembled and cleaned.

There has been shown what is now considered a preferred embodiment of the invention but it is obvious that changes and omissions may be made without departing from its spirit.

What is claimed is:

1. A fruit juicing apparatus comprising a supporting reservoir having a neck, an elongated imperforate vertical tube fixedly fitted into said neck and extending upwardly therefrom and having a lower lateral opening communicating with said reservoir, said tube being adapted to penetrate a fruit whereby juice from said fruit may flow through said opening and into said reservoir, said tube having an opening at its top so that juice from said reservoir may be dispensed therethrough, and means surrounding said tube and having sharp edges for cutting fruit pulp penetrated by said tube and rotated thereabout, said means being operative to direct juice to said lateral opening and thence to said reservoir.

2. A fruit juicing apparatus according to claim 1 and wherein said means comprises a second vertical tube concentric with and surrounding said first mentioned tube, said second tube having sharp-edged sidewall openings for cutting fruit pulp and admitting juice therethrough to said first tube lateral opening and thence to said reservoir.

3. A fruit juicing apparatus for citrus fruits having a covering skin, said apparatus comprising a supporting reservoir having a neck, an elongated vertical tube connected to and extending upwardly from said neck so as to permit juice to be dispensed therethrough from said tube, said tube being imperforate along substantially its entire length and being formed with a lower lateral opening communicating with said reservoir, said tube being adapted to penetrate completely through a fruit, and vertically elongated means shorter than said tube and surrounding said tube for cutting into the pulp of said penetrated fruit when the fruit is rotated around said means, said means being adapted to penetrate and be completely enclosed by the penetrated fruit and to support the penetrated fruit by the upper skin of said penetrated fruit.

4. A fruit juicing apparatus according to claim 3 and wherein said vertically elongated means guides juice along the outside of said tube and into said lateral opening.

5. A fruit juicing apparatus according to claim 4 and including a conical member surrounding said means and of a size adapted to seat and support a fruit penetrated by said tube.

6. A fruit juicing apparatus according to claim 4 and wherein the upper end of said tube is provided with a single pouring opening, said pouring opening being 180° removed from said lower lateral opening.

7. A fruit juicing apparatus according to claim 6 and including a cap for the upper end of said tube, said cap having a protuberance fitting within said pouring opening, and a pointed beak formed on said cap for pointing out the direction of flow of the juice when the apparatus is tilted to dispense juice.

8. A fruit juicing apparatus comprising a hollow conical, flat bottomed supporting reservoir, a chamber seated on said reservoir, a first tube extending upwardly from said reservoir and through and above said chamber, a conical baffle extending downwardly from the top edge of said chamber, and a second tube surrounding said first tube, said second tube having sidewall openings for admitting juice therethrough when a juicy fruit is impaled thereon, said first tube having a lower opening communicating with said reservoir, said sidewall openings and said lower opening communicating with each other.

9. A fruit juicing apparatus according to claim 8 and wherein said second tube is shorter than said first tube and is larger than said first tube in diameter whereby a piece of fruit may be impaled on both tubes with a top skin portion thereof disposed between the upper ends of the tubes.

10. A fruit juicing apparatus comprising a supporting reservoir, an elongated vertical tube extending upwardly from said reservoir and having a lateral opening communicating with said reservoir, said tube being adapted to penetrate a fruit whereby juice from said fruit may flow through said opening and into said reservoir, said tube having an opening at its top so that juice from said reservoir may be dispensed therethrough, and a second vertical tube concentric with and surrounding said first mentioned tube, said second tube having sharp-edged sidewall openings for cutting fruit pulp and admitting juice therethrough to said first tube lateral opening and thence to said reservoir, said second tube being shorter than said first tube.

11. A fruit juicing apparatus according to claim 10 and wherein the upper ends of both tubes are toothed, the upper end of said first tube being sharpened.

12. A fruit juicing apparatus according to claim 10 and including an upper chamber over said reservoir, and a conical baffle within said upper chamber and adapted to support a piece of fruit thereon while the fruit is impaled over both of said tubes.

13. A fruit juicing apparatus according to claim 10 and wherein the upper end of said first tube is provided with a pouring opening, said pouring opening being 180° removed from said lateral opening.

14. A fruit juicing apparatus according to claim 13 and including a cap for the upper end of said first tube, said cap having a protuberance fitting within said pouring opening, and a pointed beak formed on said cap for pointing out the direction of flow of the juice when the apparatus is tilted to dispense juice.

References Cited in the file of this patent

UNITED STATES PATENTS

| | | |
|---|---|---|
| 1,882,065 | Cody | Oct. 11, 1932 |
| 1,990,949 | Maull | Feb. 12, 1935 |
| 2,116,325 | Rogers | May 3, 1938 |
| 2,807,205 | Gilman | Sept. 24, 1957 |

FOREIGN PATENTS

| | | |
|---|---|---|
| 1,007,612 | France | Feb. 6, 1952 |